United States Patent [19]

Leiber et al.

[11] 4,082,370

[45] Apr. 4, 1978

[54] MONITORING DEVICE FOR AN ANTILOCKING BRAKE CONTROL SYSTEM

[75] Inventors: Heinz Leiber; Udo Blasius, both of Leimen, Germany

[73] Assignee: Teldix G.m.b.H., Heidelberg, Germany

[21] Appl. No.: 762,454

[22] Filed: Jan. 25, 1977

[30] Foreign Application Priority Data

Feb. 4, 1976 Germany .............................. 2604148

[51] Int. Cl.² .............................................. B60T 8/00
[52] U.S. Cl. ..................................... 303/92; 340/52 B
[58] Field of Search ............. 91/363 A; 235/153 AM; 244/194; 303/92; 318/563, 565; 340/52 B, 53, 146.1 BE, 248, 253 B, 253 S

[56] References Cited

U.S. PATENT DOCUMENTS

| | | | |
|---|---|---|---|
| 3,505,929 | 4/1970 | Coppola et al. | 244/194 X |
| 3,759,582 | 9/1973 | Ohta et al. | 340/52 B X |
| 3,866,980 | 2/1975 | Eisele et al. | 303/92 |
| 3,874,743 | 4/1975 | Fleischer et al. | 340/52 B X |
| 3,909,072 | 9/1975 | Geier | 303/92 |
| 3,964,017 | 6/1976 | Arai et al. | 303/92 X |

FOREIGN PATENT DOCUMENTS

| | | | |
|---|---|---|---|
| 2,147,724 | 4/1973 | Germany | 303/92 |
| 2,515,968 | 9/1976 | Germany | 303/92 |

*Primary Examiner*—Stephen G. Kunin
*Attorney, Agent, or Firm*—Spencer & Kaye

[57] ABSTRACT

A monitoring arrangement for electrical components or groups of components in an antilocking brake control system wherein the monitoring arrangement includes switching devices for monitoring the components and for generating a signal upon the occurrence of a malfunction, and a memory arrangement for storing a signal indicating such a malfunction. The memory arrangement is provided with at least a number of memory states which corresponds to the number of components or groups of components to be monitored and the switching devices for monitoring the components or groups of components and the memory arrangement are interconnected in such a manner that upon occurrence of a malfunction the associated memory state of the memory arrangement will be actuated.

9 Claims, 2 Drawing Figures

MONITORING DEVICE FOR AN ANTILOCKING BRAKE CONTROL SYSTEM

BACKGROUND OF THE INVENTION

The present invention relates to a monitoring device for electrical components or groups of components in an antilocking brake control system. More particularly the present invention relates to such a monitoring device which includes switching means for monitoring the components and for producing a signal upon an occurrence indicating a malfunction, which signal is stored in a memory arrangement.

A monitoring device of the above type is known from German Offenlegungsschrift (Laid-Open Patent Application) No. 2,232,034, corresponding to U.S. Pat. No. 3,883,184 to W. Jonner et al issued May 13th, 1975, the subject matter of which is incorporated herein by reference. In the known arrangement a check is made as to whether certain signals from the evaluation circuit last too long. If they last more than a given period of time, a relay is tripped, a signal lamp is switched on and the control system is switched off. The relay cannot be reset by disappearance of the malfunction so that the indication of the malfunction remains stored.

In such a monitoring device it is possible to detect the presence of a malfunction but not the location of the malfunction. Once the malfunction disappears, it can no longer be determined at a later date why the monitoring circuit responded.

SUMMARY OF THE INVENTION

It is the object of the present invention to design the monitoring circuit in such a manner that it can be determined at once where in the monitored system a malfunction is occurring or did occur.

This is accomplished according to the present invention in that in a monitoring device for an antilocking brake control system wherein the monitoring device includes switching devices for monitoring the electrical components or groups of such components and for generating an electrical signal upon the occurrence of a malfunction, and a memory arrangement for storing any such generated electrical signal, the memory arrangement includes means for providing at least a number of memory locations or states corresponding to the number of components or groups of components to be monitored and circuit means for interconnecting the outputs of the switching means and inputs of the memory arrangement in such a manner that upon the occurrence of a signal indicating a malfunction the memory location or state of the memory arrangement associated with the particular switching device producing the output signal is actuated or addressed.

In the present invention, similarly to the above-mentioned prior art arrangements, signals can be generated when a signal lasts too long and each one of these signals can actuate storage in the memory. However, in the present invention, and this is preferred, it is also possible to monitor components or groups of components, e.g., sensors or lines, for short circuits or interruptions in the lines, and to generate a signal initiating storage of a value indicating the location of such a malfunction when there is a change in voltage and/or current at one particular point of the antilocking control system.

According to the preferred embodiment of the invention, the memory arrangement includes a plurality of bistable stages, for example, flip-flops. However, it is to be understood that other types of memory arrangements, e.g., magnetic memories, such as holding relays or the like, can also be used. In its simplest form, each component or group of components being monitored can have such a memory element, i.e., a bistable stage associated with it in which case with $n$ bistable elements in the memory arrangement, $n$ components or groups of components could be monitored. Preferably however, according to the invention, the memory arrangement includes $n$ bistable elements whose inputs are interconnected with the switching devices monitoring the components so that the possible combinations of the positions of the $n$ bistable stages or the like are utilized as memory states or addresses, resulting in $(n^2 - 1)$ memory states for the $n$ stages (plus the normal state). Consequently $(n^2 - 1)$ components can be monitored with a memory arrangement containing only $n$ bistable elements.

It is to be understood that in addition to simple switching devices for detecting a malfunction, filters can be used to set the memory only if a malfunction occurs several times, i.e., over a certain period of time.

In the preferred embodiment of the invention, i.e., when no separate memory element is provided for each malfunction, order to be able to clearly recognize the occurring malfunction the memory arrangement is provided with a logic circuit arrangement for blocking further storage in the memory arrangement upon the occurrence of a malfunction signal. Moreover, a sensing circuit is provided to interrogate the memory arrangement in order to detect the location of the malfunction. In the above-described preferred embodiment utilizing the position combinations of the $n$ bistable stages, logic switching circuitry is provided for this purpose which successively connects the individual bistable stages employed to an output line. This permits the interrogator to clearly recognize which ones of the bistable stages had been flipped, and thus identify the malfunction presently taking place or just having occurred e.g., a loose connection.

It is advisable to occasionally test the monitoring circuit for its operability, e.g., at the start of each trip.

According to a further feature of the invention, a warning system may also be provided for the monitoring device which warning system is connected with the memory devices of the memory arrangement in such a manner that the warning device is actuated when any memory location is occupied, i.e., contains a stored signal indicative of a malfunction.

DETAILED DESCRIPTION OF THE PREFERRED EMBODIMENTS

Figure 1:
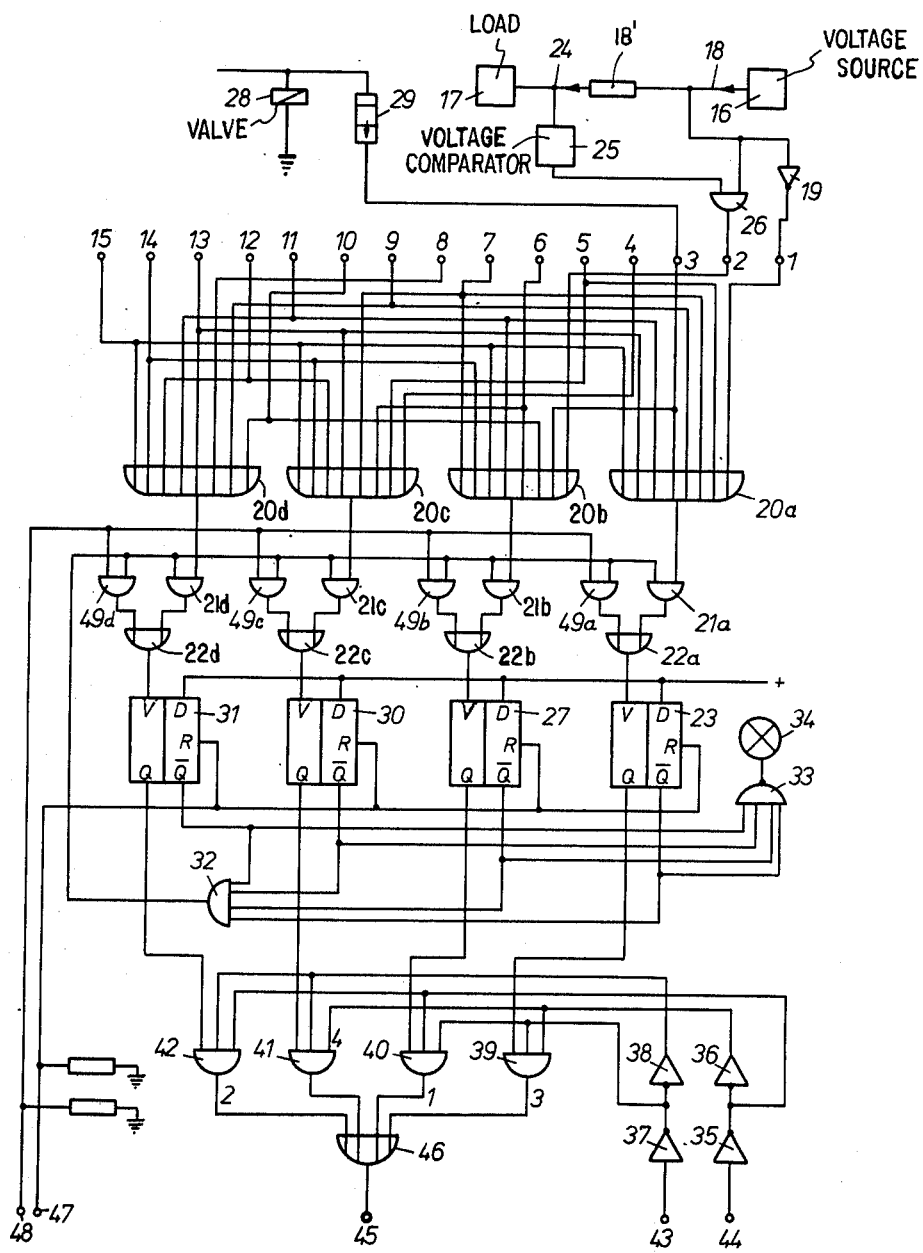
FIG. 1 is a logic circuit diagram of a preferred embodiment of a monitoring device according to the invention.

Referring now to the Figure, there is shown a logic circuit diagram of a monitoring circuit according to the invention for an antilocking brake control system which is capable of monitoring fifteen different components or groups of components for the presence of malfunctions and for identifying the source of the malfunction. As shown the memory arrangement has fifteen input terminals 1–15 to which fifteen possible signals, each indicating the occurrence of a certain malfunction of a component of the antilocking brake control system can be applied. In the illustrated embodiment only the input terminals 1 to 3 are shown as being connected to switching devices for monitoring components for the presence of malfunctions and for producing an electrical signal indicative thereof, with three different possibilities for such signal generation being illustrated.

The input terminal 1 is connected via an inverter 19 to a line 18 which includes a series resistance 18' and is connected between a voltage source 16 and a load 17. If the connecting line 18 between this source 16 and the load 17 is interrupted, a signal indicating this malfunction will appear at input terminal 1 due to the presence of inverter 19.

The input terminal 2 receives a signal if the load 17 has a short circuit. To provide this signal, the input terminal 2 is connected to the output of an AND gate 26 having one input connected to the output of a voltage comparison stage 25 whose input is connected to a point 24 in the line 18. If a short circuit in the load 17 should occur, the voltage at point 24 will drop, causing the voltage comparison stage 25 to emit a signal which is transmitted to terminal 2 via AND gate 26. The AND gate 26 whose other input is connected to the line 18 on the side of resistor 18' opposite point 24 is only required in the illustrated circuit arrangement so that no signal is received at input terminal 2 if there is a break in the line 18, which malfunction is to be indicated by a signal at terminal 1.

Finally, a signal will appear at input terminal 3 if pressure control valve 28 is being controlled for too long a time by the antilocking brake control system. In such case a signal is generated via the timing element 29 whose output is directly connected with terminal 3.

In order to be able to recognize which of the fifteen input terminals 1–15 has received a signal indicating a malfunction, a memory arrangement having at least fifteen states or locations must be provided. Although such a memory arrangement could simply include fifteen separate bistable memory elements or locations, i.e., one connected to each of the input terminals 1–15, according to the preferred embodiment of the invention, only four bistable members 23, 27, 30 and 31 which may, for example, be flip-flops as illustrated, are provided so that sixteen different memory states or storage combinations are available, i.e., fifteen different states each associated with and identifying one of the input terminals 1–15 and a sixteenth or normal state for indicating the absence of any malfunction. So that each of the terminals will be associated with a separate state or position combination of the four bistable members 23, 27, 30 and 31, the input terminals 1–15 are selectively connected to one or more of four OR gates 20a–20b so that, depending on which one of the inputs 1–15 receives a signal, a different and unique combination of signals will appear at the outputs of the OR gates 20a–20d. For example, the terminal 1 is connected only to the OR gate 20a, and hence a signal at terminal 1 will only produce a signal at the output of OR gate 20a while the terminal 7 is connected to each of OR gates 20a, 20b and 20c and hence a signal at terminal 7 will simultaneously produce an output signal from each of these OR gates. The outputs of each of these OR gates 20a–20d is connected via a respective normally enabled AND gate 21a–21d and a respective OR gate 22a–22d to the signal inputs of the bistable members 23, 27, 30 and 31 respectively. With this memory arrangement, a malfunction indicating signal at terminal 1 will, via the connected gates, cause only bistable member 23 to flip, a malfunction indicating signal at terminal 2 will cause only bistable member 27 to flip, while a malfunction indicating signal at terminal 3 will cause bistable members 23 and 27 to flip. In a similar manner a signal at terminal 5, for example, causes bistable members 23 and 30 to flip, a signal at terminal 10 causes bistable members 27 and 31 to flip, a signal at terminal 13 causes bistable members 23, 30 and 31 to flip, and a signal at terminal 15 causes all four bistable members to flip.

Connected to the output of each of the bistable members 23, 27, 30 and 31 is an AND gate 32 whose output is connected to one input of each of the AND gates 21a–21d. The AND gate 32 produces an output signal to enable each of the AND gates 21a–21d as long as none of the bistable members 23, 27, 30 or 31 has flipped, indicating the storage of a malfunction indicating signal. However, if one or more of the bistable stages 23, 27, 30 or 31 has flipped, AND gate 32 will not produce an output signal and consequently all of the AND gates 21a–21d will be blocked, thus preventing any further input signals from the terminals 1–15 from being transmitted to the bistable members 23, 27, 30 and 31 to change the memory stage of the memory arrangement.

In order to provide an indication that a malfunction has been detected, also connected to the outputs of the bistable members 23, 27, 30 and 31 is an AND gate 33 having an inverted output which is connected to a warning indicator 34, which may for example, be a lamp. With the illustrated connection arrangement, the flipping of any one of the bistable members 23, 27, 30 or 31 will cause the warning lamp 34 to be switched on via AND gate 33.

To interrogate the memory arrangement and thus sense the stored memory state a circuit including series connected inverters 35–36 and 37–38, AND gates 39–42, and an OR gate 46 is provided. Each of the AND gates 39–42 has one input connected to the normal output of one of the bistable members 23, 27, 30 and 31 respectively, and its output connected to an input of the OR gate 46. The other inputs of the AND gates 39–42 are connected to the outputs of selected ones of the inverters 35–38 in a manner so that the individual AND gates 39–42 may be selectively enabled. In particular, in the illustrated embodiment, the output of inverter 35 is connected to one input of each of the AND gates 40 and 42, the output of the inverter 36 is connected to one input of each of the AND gates 39 and 41, the output of inverter 37 is connected to one input of each of the AND gates 39 and 40, and the output of inverter 38 is connected to one input of each of the AND gates 41 and 42. With this arrangement, if no signals are applied to terminals 43 and 44, which are connected to the inputs of inverter 37 and 35, respectively, only AND gate 40 will be enabled to connect the output of bistable member 27 with the OR gate 46. Depending on whether the bistable member 27 is in its normal state or has been flipped, a binary "L" or a binary "O" signal will be present at the output terminal 45 of the OR gate 46, and consequently the state of the bistable member 27 can be determined. In a similar manner, if a signal is applied to terminal 43, but no signal is applied at terminal 44, AND gate 42 becomes conductive or enabled and bistable member 31 is interrogated, if a signal is applied only at terminal 44, AND gate 39 becomes enabled and bistable member 23 is interrogated and finally, when signals are present at both terminals 43 and 44, AND gate 41 becomes enabled so that bistable member 30 is interrogated. From the combination of O and L signals appearing successively at the output 45 during interrogation, the particular one of the input terminals 1 to 15 at which the malfunction signal which initiated the storage process can be determined. Thus, even if the malfunction signal has disappeared or ceased the type of malfunction which did occur and its location will be known.

Upon completion of the successive interrogation of the bistable members 23, 27, 30 and 31 via the signals selectively applied at terminals 43 and 44, the bistable members 23, 27, 30 and 31 can be reset to their normal or starting positions by means of a pulse applied at terminal 47, which is connected to the reset input R of each of the bistable members. Additionally, by means of a pulse applied at a terminal 48, all of the bistable members 23, 27, 30 and 31 can be flipped if they are all in their starting or normal position. However, if a signal is stored in the memory, i.e., at least one of the bistable members has flipped, then a pulse applied at terminal 48 will have no effect on the memory state due to the fact that all of the AND gates 49a–49d are blocked via the absence of an enabling signal from AND gate 32. The flipping of all bistable members via terminal 48 may be done to test e.g. at the start of each trip if the memory element is operative.

Figure 2:
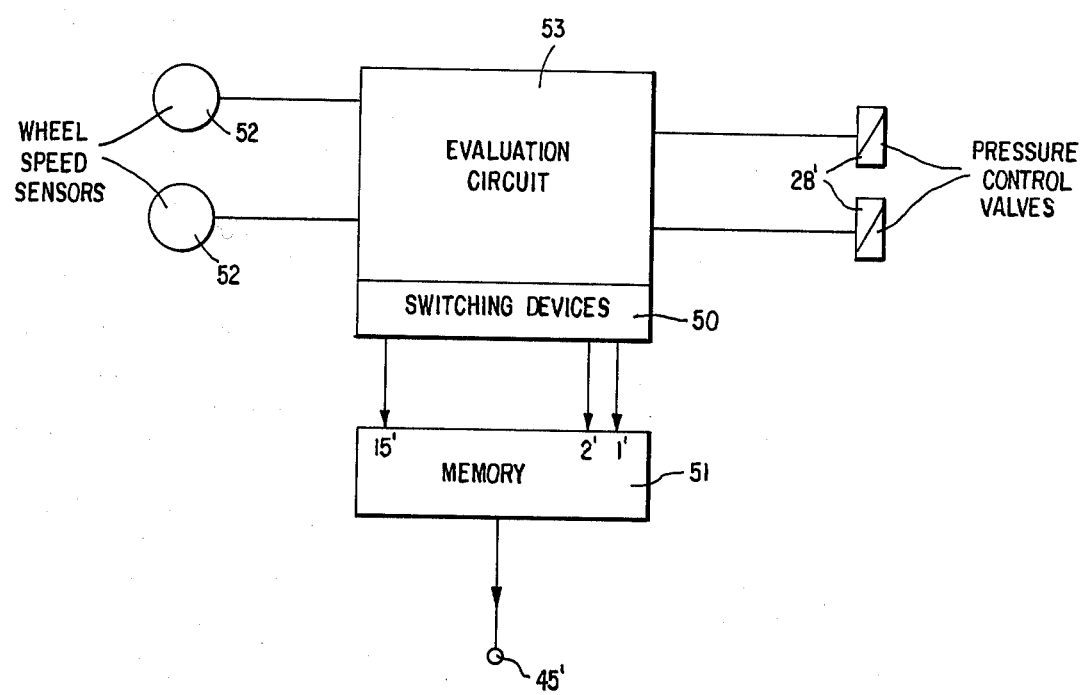
FIG. 2 is a block diagram of an anti-locking control system combined with a monitoring device according to the invention.

In FIG. 2 the monitoring device is shown as two blocks numbered 50 and 51 with the output terminal 45′ corresponding to terminal 45 of FIG. 1. The block 50 contains the switching means such as 19, 25/26 or 29 of FIG. 1, while the block 51 with inputs 1′ to 15′ may contain the memory arrangement. The switching means 50 are connected to an evaluation circuit 53 which is part of an anti-locking-control system. With sensors 52 the rotational behavior of the vehicle wheels are sensed and in the evaluation circuit 53 control-signals for varying the brake pressure by means of the valve 28′ are generated. The electrical components or groups of components of the evaluation circuit 53 are monitored by means of monitoring device 50 and 51.

It will be understood that the above description of the present invention is susceptible to various modifications, changes and adaptations, and the same are intended to be comprehended within the meaning and range of equivalents of the appended claims.

What is claimed is:

1. In the combination of an antilocking control system, including a plurality of different electrical components, for wheel brakes of a vehicle, and a monitoring device for the electrical components or groups of electrical components in said antilocking brake control system, said monitoring device including respective switching means, each connected to an associated component or group of components, for monitoring the components and for generating a signal at a respective output upon the occurrence of a malfunction, and a memory arrangement for storing any such generated signal; the improvement wherein: said switching means are associated with and monitor a plurality of different type electrical components or groups of electrical components which are located at correspondingly different points of the antilocking brake control system for malfunction; and said memory arrangement includes memory means, having a plurality of inputs, for providing at least a number of memory states which corresponds to the number of components or groups of components to be monitored, and circuit means for interconnecting the outputs of said switching means and the inputs of said memory means in such a manner that, upon occurrence of a signal indicating a malfunction, the memory state of said memory arrangement which is associated with the one of said switching means producing said signal indicating a malfunction will be actuated.

2. A monitoring device as defined in claim 1 wherein said memory means for providing at least a number of memory states includes $n$ bistable members each having an input whereby $n^2$ possible combinations are realizable from the various combinations of the positions of said bistable members; and wherein said circuit means includes means for connecting said switching means to the inputs of said bistable members so that one of said $n^2$ possible combinations is associated with a respective one of said switching means, whereby $(n^2 - 1)$ components may be monitored.

3. A monitoring device as defined in claim 2 further comprising additional circuit means for blocking said inputs of said bistable members after a signal indicating a malfunction has been stored.

4. A monitoring device as defined in claim 3 further comprising an externally controllable sensing circuit means connected to said memory arrangement for determining the memory state of said memory arrangement.

5. A monitoring device as defined in claim 4 wherein said sensing circuit means includes logic circuit means for successively connecting associated outputs of said bistable members to an output line to determine the position of said bistable members.

6. A monitoring device as defined in claim 5 further comprising a warning device, and means connected to associated outputs of said bistable members and to said warning device, for actuating said warning device when a memory state indicating a stored malfunction signal is present.

7. A monitoring device as defined in claim 1 further comprising additional circuit means for blocking said inputs of said memory means whenever a signal indicating a malfunction has been stored.

8. A monitoring device as defined in claim 1 further comprising a means for interrogating said memory arrangement to determine the location of any signal stored therein.

9. A monitoring device as defined in claim 1 further comprising means for producing an output signal whenever a signal indicating a malfunction is stored in said memory arrangement.

* * * * *